United States Patent
Kon et al.

(10) Patent No.: US 9,937,757 B2
(45) Date of Patent: Apr. 10, 2018

(54) TIRE

(71) Applicant: BRIDGESTONE CORPORATION, Chuo-ku, Tokyo (JP)

(72) Inventors: Seiji Kon, Tokyo (JP); Keiichi Hasegawa, Tokyo (JP); Yoshihide Kouno, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 88 days.

(21) Appl. No.: 14/770,823

(22) PCT Filed: Mar. 4, 2014

(86) PCT No.: PCT/JP2014/055505
§ 371 (c)(1),
(2) Date: Aug. 27, 2015

(87) PCT Pub. No.: WO2014/136791
PCT Pub. Date: Sep. 12, 2014

(65) Prior Publication Data
US 2016/0001607 A1    Jan. 7, 2016

(30) Foreign Application Priority Data

Mar. 5, 2013  (JP) ................................. 2013-043476

(51) Int. Cl.
*B60C 5/00* (2006.01)
*B60C 5/01* (2006.01)
(Continued)

(52) U.S. Cl.
CPC ........ *B60C 13/002* (2013.01); *B29D 30/0678* (2013.01); *B29D 30/56* (2013.01);
(Continued)

(58) Field of Classification Search
CPC .. B60C 5/00; B60C 5/01; B60C 11/00; B60C 11/01; B60C 13/00
See application file for complete search history.

(56) References Cited

U.S. PATENT DOCUMENTS 3,977,453 A * 8/1976 Coran .................... B29D 30/08
                                                         152/323
4,030,530 A * 6/1977 Curtiss, Jr. .............. B60C 27/20
                                                         152/179
(Continued)

FOREIGN PATENT DOCUMENTS

CN     104995034 A    10/2015
DE      2934521    *  3/1981
(Continued)

OTHER PUBLICATIONS

Extended European Search Report dated Feb. 19, 2016, issued in corresponding EP Patent Application.
(Continued)

*Primary Examiner* — Justin R Fischer
(74) *Attorney, Agent, or Firm* — Solaris Intellectual Property Group, PLLC

(57) ABSTRACT

Tire frame step portions 18 are formed to a tire frame member 17. The tire frame step portions 18 are formed further toward the tire equatorial plane side than tire axial direction end portions 30A of a tread member 30. Covering layers 24 are formed at the outside of the tire frame member 17 so as to span from bead portions to the tire frame step portions 18.

6 Claims, 14 Drawing Sheets

(51) Int. Cl.
    *B60C 13/00*     (2006.01)
    *B29D 30/06*     (2006.01)
    *B29D 30/56*     (2006.01)
    *B29D 30/58*     (2006.01)
    *B60C 1/00*     (2006.01)
    *B60C 9/18*     (2006.01)
    *B60C 11/01*     (2006.01)
    *B60C 15/04*     (2006.01)
    *B60C 9/22*     (2006.01)
    *B60C 13/04*     (2006.01)
    *B29D 30/32*     (2006.01)
    *B29D 30/48*     (2006.01)

(52) U.S. Cl.
    CPC ............ *B29D 30/58* (2013.01); *B60C 1/0025* (2013.01); *B60C 5/01* (2013.01); *B60C 9/18* (2013.01); *B60C 11/01* (2013.01); *B60C 15/04* (2013.01); *B29D 2030/3285* (2013.01); *B29D 2030/486* (2013.01); *B60C 9/22* (2013.01); *B60C 2013/045* (2013.01); *B60C 2015/042* (2013.01); *B60C 2015/046* (2013.01)

(56) References Cited

U.S. PATENT DOCUMENTS

| | | |
|---|---|---|
| 4,253,513 A | 3/1981 | Larson et al. |
| 4,444,612 A * | 4/1984 | Fink .................. B29D 30/0606 152/452 |
| 2015/0367587 A1 | 12/2015 | Kon |

FOREIGN PATENT DOCUMENTS

| | | |
|---|---|---|
| EP | 2960078 A1 | 12/2015 |
| JP | S56-057506 A | 5/1981 |
| JP | H03-143701 A | 6/1991 |
| JP | 2011-207434 A | 10/2011 |

OTHER PUBLICATIONS

Search Report of the Chinese office action dated Jul. 17, 2017, from the SIPO in a Chinese patent application corresponding to the instant patent application.

* cited by examiner

TIRE

TECHNICAL FIELD

The present invention relates to a tire, and in particular relates to a tire with a tire frame member formed using a resin material.

BACKGROUND ART

Tires formed from rubber, organic fiber materials, and steel members are already known. There is recently demand, from the viewpoints of weight reduction and ease of recycling, to make tire frame members from thermoplastic polymers such as thermoplastic elastomers (TPE) and thermoplastic resins. A tire frame member formed by covering a bead core with a thermoplastic elastomer is disclosed, for example, in Japanese Patent Application Laid-Open (JP-A) No. H03-143701.

SUMMARY OF INVENTION

Technical Problem

However, in JP-A No. H03-143701, the tire frame member is exposed at a side section of the tire. The material of the tire frame member itself needs to be changed when raising the weather resistance of the tire in the configuration of JP-A No. H03-143701 is considered, leading to a reduction in the degrees of freedom for design.

In consideration of the above circumstances, the present invention addresses raising the weather resistance of the tire frame member, while still maintaining the degrees of freedom for design of the tire frame member itself in cases in which the tire frame member is formed from a resin material.

Solution to Problem

A tire according to a first aspect of the present invention includes: a tire frame member that is formed from a resin material and that includes at least a bead portion; a tread member that is disposed at a tire radial direction outer side of the tire frame member and that configures a tire tread; a tire frame step portion that is formed to a tire radial direction outer face side of the tire frame member, and that is formed further toward a tire equatorial plane side than a tire axial direction end portion of the tread member, and that becomes lower at a tire axial direction outer side; and a covering layer that is formed at an outer side of the tire frame member so as to span from the bead portion to the tire frame step portion.

In the tire according to the first aspect, the tire frame step portion is disposed further toward the tire equatorial plane side than the tire axial direction end portions of the tread member, and the entire outer face of the tire frame member from the bead portions to the tread member is covered by the covering layer. The surface of the tire frame member is therefore not exposed, thereby enabling the outer face of the tire to be protected and the weather resistance raised, while maintaining degrees of freedom for design of the tire frame member itself. The covering layer may be formed using a resin material, and may be formed using rubber.

In the tire according to the first aspect, the tire frame step portions are formed, and so the tire frame step portions can be employed as dams to stop the flow of covering layer material when molding the covering layer with a mold or the like. Thus the covering layer material can be suppressed from protruding and flowing out from the designated mold position at the end portions of the covering layer, enabling the end portions of the covering layer to be appropriately formed.

The tire frame step portion here configures a wall face that stands out from the surface of the tire frame member, and may be configured by a step, or may be configured by a protrusion. The angle between the surface of the tire frame member and the wall face may be smaller than 90 degrees.

A tire according to the second aspect of the present invention includes a flow stopping wall formed at an end portion on a tire tread side of the covering layer and adjacent to the tire axial direction end portion of the tread member.

According to the tire of the second aspect, when forming the tread member at the tire radial direction outer of the tire frame member, the flow stopping walls can be employed to dam the flow of material employed when forming the tread member. This thereby enables the material employed when forming the tread member to be suppressed from protruding and flowing out past a specific position at the tire axial direction outer side end portions of the tread member, enabling the tire axial direction end portions of the tread member to be appropriately formed.

In a tire according to a third aspect of the present invention, the tire frame member includes a reinforcement layer that is disposed at a tire radial direction outer side portion and that has a reinforcement cord, and the tire frame step portion is disposed further toward the tire axial direction outer side than a tire shoulder side end portion of the reinforcement layer.

In the tire according to the third aspect, the covering layer is disposed further toward the tire axial direction outer side than the reinforcement layer, avoiding the reinforcement layer from being covered by the covering layer, and enabling the tread member to be appropriately laminated at the tire radial direction outer side of the reinforcement layer.

Advantageous Effects of Invention

In the tire according to the first aspect of the present invention, the surface of the tire frame member is not exposed, enabling the outer face of the tire to be protected and the weather resistance raised, while maintaining degrees of freedom for design of the tire frame member itself.

The tire according to the second aspect of the present invention enables the appropriate forming of the tire axial direction end portions of the tread member.

The tire according to the third aspect of the present invention enables the tread member to be appropriately laminated at the tire radial direction outer side of the reinforcement layer.

DESCRIPTION OF EMBODIMENTS

Explanation follows regarding embodiments of the present invention, with exemplary embodiments given.

First Exemplary Embodiment

Figure 1A:
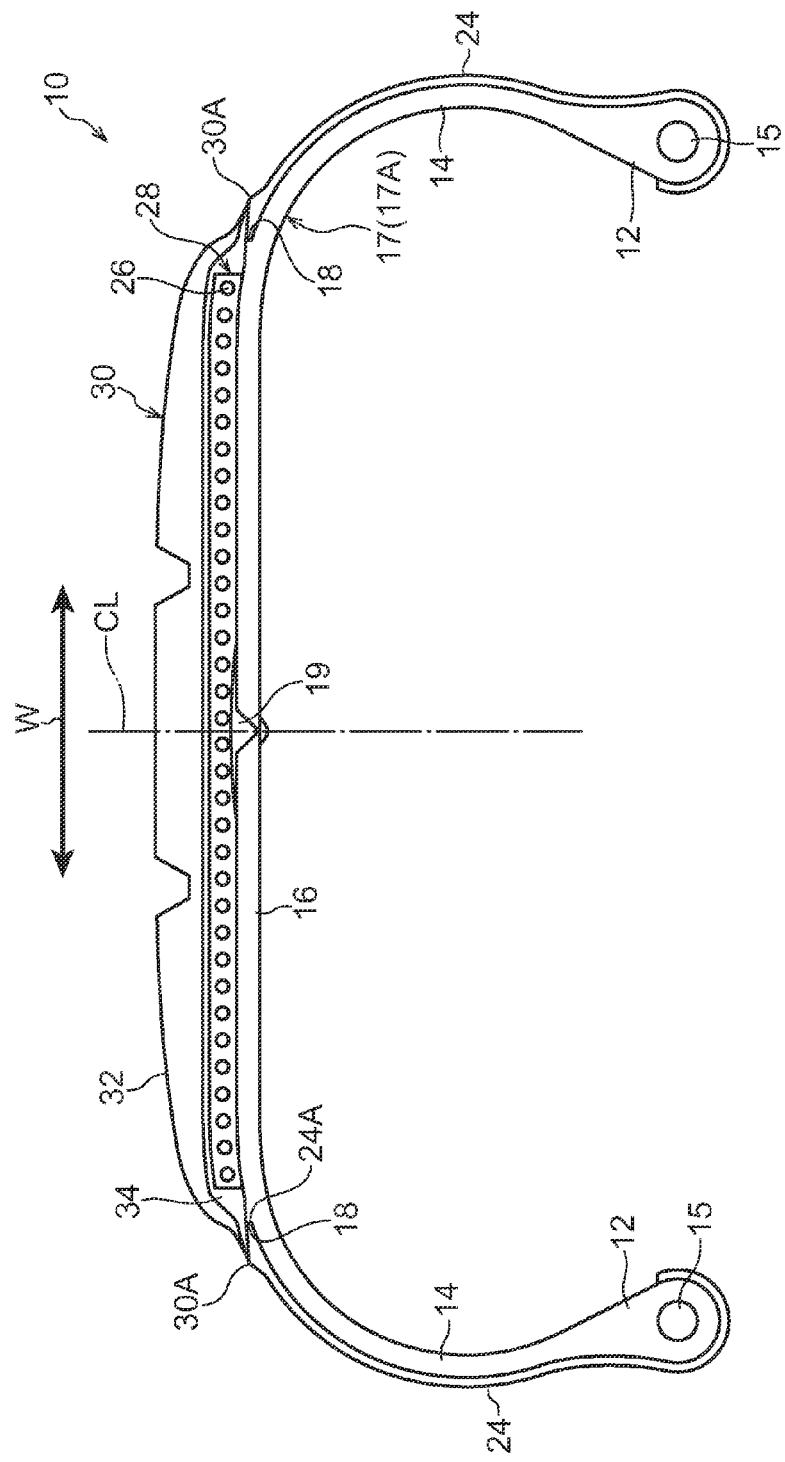
FIG. 1A is cross-section of a pneumatic tire according to a first exemplary embodiment.
Figure 1B:
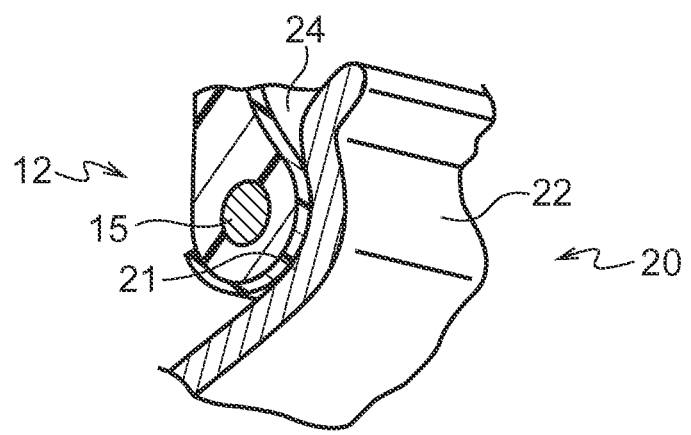
FIG. 1B is a partially enlarged cross-section of a perspective view of a pneumatic tire according to the first exemplary embodiment when mounted to a rim.

Explanation first follows regarding a first exemplary embodiment. As illustrated in FIG. 1A, a tire of the present exemplary embodiment is a pneumatic tire employed internally filled with air. A tire 10 includes a ring shaped tire frame member 17. The ring shaped tire frame member 17 includes a pair of bead portions 12 that contact a rim 20, side sections 14 that extend out from the bead portions 12 toward the tire radial direction outer side, and a crown section 16 that couples together each of the side sections 14 at the tire radial direction outer side ends thereof. As illustrated in FIG. 1B, each of the pair of bead portions 12 is in close contact with a beat seat portion 21 and a rim flange 22 of the rim 20, maintaining the internal pressure of the air filling the tire. A tread member 30 configuring a tire tread that is the ground contact portion of the tire is disposed at the tire radial direction outer side of the crown section 16.

The tire frame member 17 is formed from a resin material. Resin material referred to here does not include vulcanized rubber. Examples of the resin material include thermoplastic resins (including thermoplastic elastomers), thermoset resins, other general purpose resins, and engineering plastics (including super engineering plastics).

Thermoplastic resins (including thermoplastic elastomers) are polymer compounds of materials that soften and flow with increased temperature, and that adopt a relatively rigid and strong state when cooled. In the present specification, out of these, distinction is made between polymer compounds forming materials that soften and flow with increasing temperature, that adopt a relatively hard and strong state on cooling, and that have a rubber-like elasticity, considered to be thermoplastic elastomers, and polymer compounds forming materials that soften and flow with increasing temperature, that adopt a relatively hard and strong state on cooling, and do not have a rubber-like elasticity, considered to be non-elastomer thermoplastic resins.

Examples of thermoplastic resins (thermoplastic elastomers included) include thermoplastic polyolefin-based elastomers (TPO), thermoplastic polystyrene-based elastomers (TPS), thermoplastic polyamide-based elastomers (TPA), thermoplastic polyurethane-based elastomers (TPU), thermoplastic polyester-based elastomers (TPC), and dynamically crosslinking-type thermoplastic elastomers (TPV), as well as thermoplastic polyolefin-based resins, thermoplastic polystyrene-based resins, thermoplastic polyamide-based resins, and thermoplastic polyester-based resins.

Such thermoplastic resin materials have, for example, a deflection temperature under load (at 0.45 MPa during loading), as defined by ISO 75-2 or ASTM D648, of 78° C. or greater, a tensile yield strength, as defined by JIS K7113, of 10 MPa or greater, and a tensile elongation at break (JIS K7113), also as defined by JIS K7113, of 50% or greater. Materials with a Vicat softening temperature, as defined by JIS K7206 (method A), of 130° C. or greater may be employed.

Thermoset resins are curable polymer compounds that form a 3 dimensional mesh structure with increasing temperature. Examples of thermoset resins include phenolic resins, epoxy resins, melamine resins, and urea resins.

As the resin material, in addition to the above thermoplastic resins (including thermoplastic elastomers) and thermoset resins, general purpose resins may also be employed, such as meth(acrylic)-based resins, EVA resins, vinyl chloride resins, fluororesins, and silicone-based resins.

In the present exemplary embodiment, explanation follows regarding a case in which the tire frame member 17 is formed from a thermoplastic resin.

The tire frame member 17 is formed from circular ring shaped tire frame halves 17A that are formed in the same shape as each other by integrating together a single bead portion 12, a single side section 14 and half the width of a crown section 16. The tire frame halves 17A are aligned with each other and joined together at tire equatorial plane CL portions thereof. A welding thermoplastic material 19 is employed to join the tire equatorial plane CL portions together. The tire frame member 17 is not limited to being formed by joining together two members, and may be formed by joining together three or more members, or may be integrally formed from a pair of bead portions 12, a pair of side sections 14, and the crown section 16.

Figure 2:
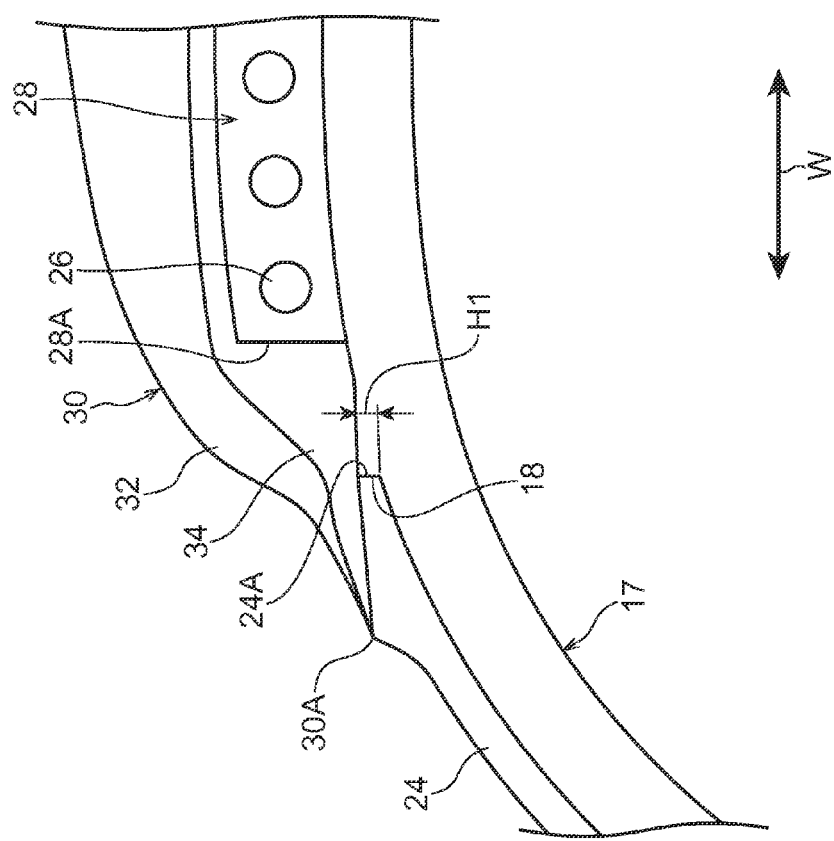
FIG. 2 is a partially enlarged cross-section of the tire shoulder portion of FIG. 1A.

As also illustrated in FIG. 2, tire frame step portions 18 are formed at the outer face of the tire frame member 17. Each tire frame step portion 18 is formed further toward the tire equatorial plane side than a tire axial direction end portion 30A of the tread member 30, described below. The tire frame step portion 18 is a stepped portion formed on the surface of the tire frame member 17 so as to be lower on the bead portion 12 side, and is integrally formed at the outer face of the tire frame member 17. The tire frame step portion 18 is a portion that defines the boundary with a covering layer 24, described below. The thickness of the tire frame halves 17A further to the tire width direction W inner side than the tire frame step portions 18 is thicker than the thickness of the tire frame halves 17A further to the tire width direction W outer side.

In the present exemplary embodiment, the tire frame step portion 18 is configured by a step, however the tire frame step portion 18 may be formed as a projection extending around the entire circumference in the tire circumferential direction.

A height H1 of the tire frame step portion 18 is preferably from 0.2 mm to 4.0 mm. This is because there is only a small damming effect of covering layer material injected at high pressure when the height H1 of the tire frame step portion 18 is less than 0.2 mm and the covering layer 24 is formed by injection molding, and the thickness of the covering layer 24 becomes too thick when the height H1 exceeds 4.0 mm.

The tire frame halves 17A formed using a thermoplastic resin may, for example, be molded using vacuum forming, pressure forming, injection molding, or melt casting. The manufacturing processes can be greatly simplified, and the forming time shortened, in comparison to rubber forming (vulcanizing).

The tire frame member 17 may be configured from a single thermoplastic resin material, or, similarly to conventional ordinary pneumatic tires, may employ thermoplastic resin materials having different characteristics from each other in each of the locations of the tire frame member 17 (the side sections 14, the crown section 16, the bead portions 12, etc.).

A circular ring shaped bead core 15 is embedded in each of the bead portions 12 of the tire frame member 17. The bead core 15 is formed from a steel cord, similarly to in conventional ordinary pneumatic tires. The bead core 15 may be omitted as long as the rigidity of the bead portions 12 is secured, and there are no problems in fitting to a rim 20. The bead core 15 may be formed from a cord other than steel, such as an organic fiber cord, or a cord of organic fiber covered in resin. The bead core 15 may also be formed not from a cord, but from a hard resin, by injection molding or the like.

A reinforcement layer 28 including a spirally wound steel cord 26 is disposed on the crown section 16 of the tire frame member 17. The reinforcement layer 28 is equivalent to a belt that is disposed at the outer peripheral face of a frame in a conventional rubber-made pneumatic tire. Tire axial direction end portions 28A of the reinforcement layer 28 are disposed further toward the tire equatorial plane CL side than the tire frame step portions 18. Thus end faces 24A of the covering layer 24, described below, are disposed further to the tire axial direction W outer side than the reinforcement layer 28, avoiding the reinforcement layer 28 from covering the covering layer 24, and enabling the tread member 30 to be appropriately laminated at the tire radial direction outside of the reinforcement layer 28.

The covering layers 24 are each formed in the tire frame member 17 from the bead portion 12 to the tire frame step portion 18. As illustrated in FIG. 1B, the end portion of the covering layer 24 on the bead portion 12 side is disposed further toward the tire inner side than the close contact portion of the bead portion 12 with the rim 20. The end portion of the covering layer 24 on the tread member 30 side is formed up to the tire frame step portion 18, and the end face 24A is in close contact with the tire frame step portion 18. When the tire 10 has been assembled to the rim 20, the covering layer 24 tightly seals an air filled space inside the tire 10 by making close contact with the rim 20. The portion of the covering layer 24 joined to the tread end portion 30A is formed thicker than the height H1 of the tire frame step portion 18.

A material having a higher weather resistance than the tire frame member 17 is employed as a covering layer material for configuring the covering layer 24. The covering layer material is preferably a material with better sealing properties than the material configuring the tire frame member 17. The modulus of elasticity of the covering layer 24 is preferably lower than the modulus of elasticity of the tire frame member 17. This thereby enables appropriate sealing to be achieved against the rim 20, while maintaining the rigidity of the tire frame member 17.

The modulus of elasticity of the covering layer 24 is preferably from 0.5 MPa to 50 MPa. This is because when the modulus of elasticity of the covering layer 24 is less than 0.5 MPa, the compression creep properties of the portion in close contact with the rim 20 are not sufficient, conceivably leading to gaps to the rim. When the modulus of elasticity of the covering layer 24 exceeds 50 MPa, insufficient compression deformation is achieved in the portion in close contact with the rim 20, conceivably leading to gaps to the rim 20.

The modulus of elasticity of the covering layer 24 is more preferably 70% of the modulus of elasticity of the tire frame member 17, or lower. The modulus of elasticity of the covering layer 24 is even more preferably 50% of the modulus of elasticity of the tire frame member 17 or lower, and is more preferably 25% or lower when a resin with excellent abrasion resistance is employed as the covering layer material configuring the covering layer 24.

Thermoplastic resins having rubber-like elasticity, thermoplastic elastomers (TPE), thermoset resins and the like may be employed as the resin material for the covering layer 24. Configuration may also be made with a rubber-formed covering layer 24. Preferable examples of the material employed in the covering layer 24 include olefin-based, ester-based, amide-based, or urethane-based TPEs, or TPVs that mixed, part rubber-based resins. Preferably a deflection temperature under load (at 0.45 MPa during loading), as defined by ISO 75-2 or ASTM D648, is 75° C. or greater, a tensile yield elongation, likewise defined by JIS K7113, is 10% or greater, a tensile elongation at break, likewise defined by JIS K7113, is 50% or greater, and a Vicat softening temperature, as defined by JIS K7206 (method A), is 130° C. or higher. Examples of thermoset resins that may be employed in the covering layer 24 include phenolic resins, urea resins, melamine resins, epoxy resins, and polyester resins.

Figure 5:
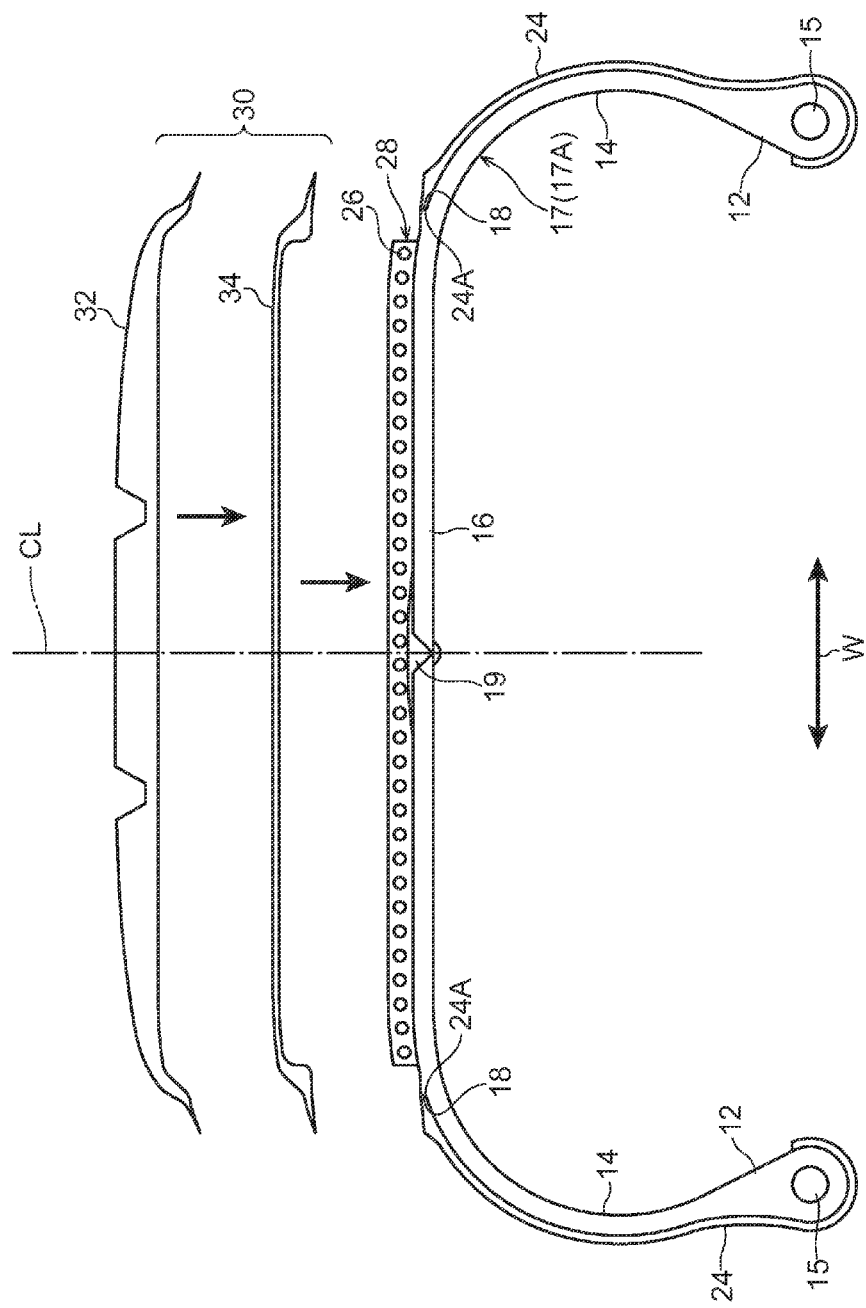
FIG. 5 is a cross-section of a tire frame member and a tread member of a pneumatic tire according to the first exemplary embodiment, prior to bonding the tread member.

As also illustrated in FIG. 5, the tread member 30 is disposed at the tire radial direction outer side of the tire frame member 17. The tread member 30 is disposed along the tire frame member 17, and configures the tire tread that is the ground contact portion of the tire 10. The tread member 30 includes a tread member main body 32 and an intermediate rubber 34. The tread member main body 32 is laminated onto the tire frame member 17, with the intermediate rubber 34 interposed therebetween. The tire axial direction end portions 30A of the tread member 30 are disposed further to the tire axial direction outer side than the end faces 24A of the covering layer 24. The end faces 24A of the covering layer 24 are thereby covered by the tread member 30, and the entire outer face of the tire frame member 17 from the bead portions 12 to the tread member 30 is covered by the covering layers 24. The covering layer 24 may be a single body from the bead portions 12 to the tread member 30, or may be configured as a divided body.

The tread member 30 is formed from a rubber with better abrasion resistance than the thermoplastic resin forming the side sections 14. The rubber employed in the tread member 30 may employ the same type of rubber as rubber employed in conventional rubber-made pneumatic tires. The tread member 30 may be configured by employing a thermoplastic resin of another type having better abrasion resistance to than the thermoplastic resin forming the side sections 14.

Explanation follows regarding a manufacturing method of the tire 10 according to the present exemplary embodiment.

In the present exemplary embodiment, first the tire frame halves 17A are formed by injection molding. The bead cores 15 are placed in the mold employed for forming the tire frame halves during injection molding, and are embedded in the respective pair of bead portions 12.

Figure 3:
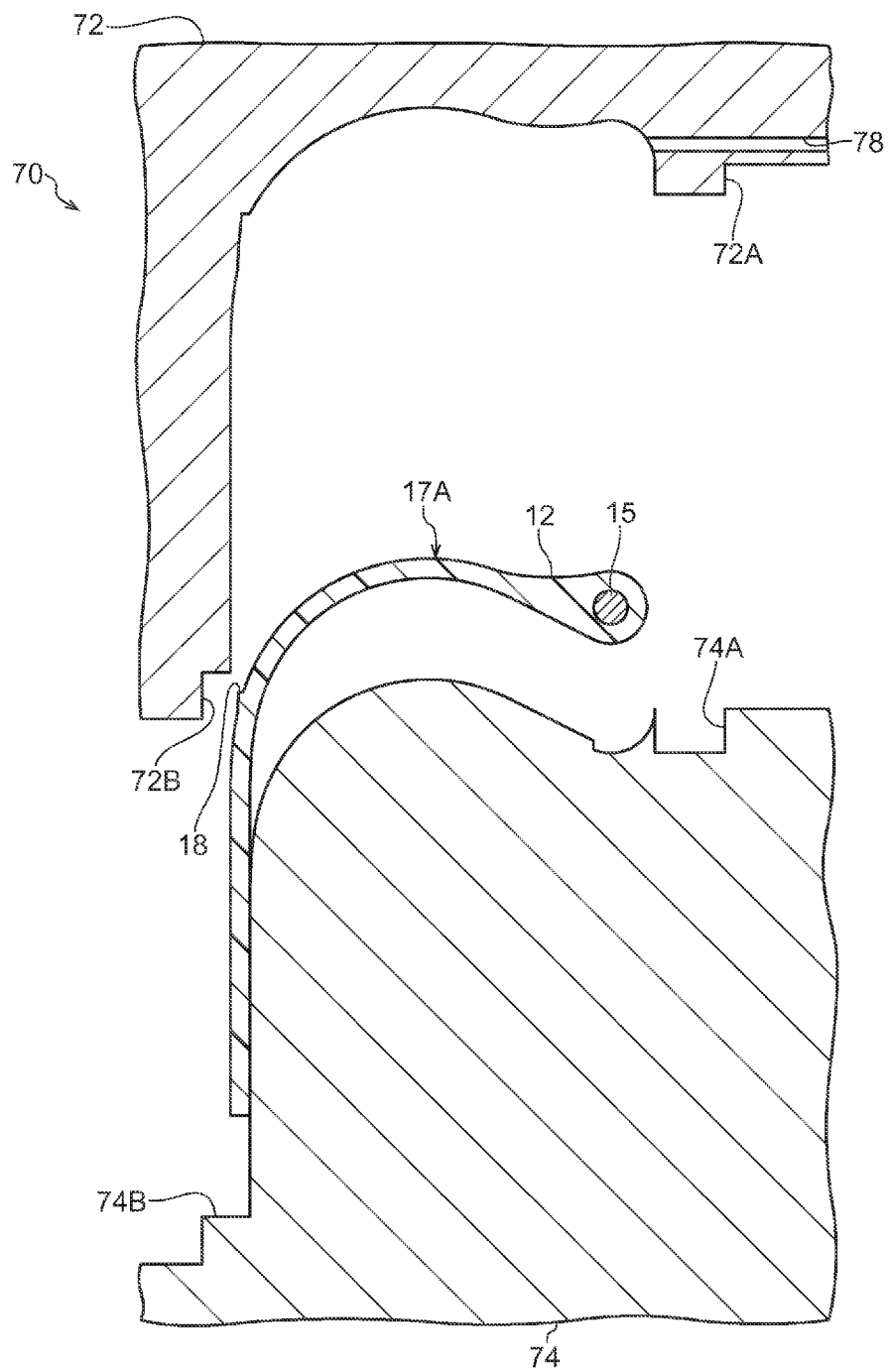
FIG. 3 is a partial cross-section of a mold employed in the first exemplary embodiment, illustrated in an open state.

The covering layer 24 is then formed on the outer face of the tire frame half 17A. A covering layer forming mold 70 such as that illustrated in FIG. 3 is employed in manufacturing the covering layer 24.

The covering layer forming mold 70 is configured by an outer mold 72 and an inner mold 74, with a gate 78 formed in the outer mold 72 for injecting the covering layer material. The gate 78 is configured such that covering layer thermoplastic material is injected from the radial direction inner side of the bead portion 12 of the tire frame half 17A. The gate 78 may be provided as pin gates at multiple points in the circumferential direction of the tire frame half 17A, or may employ a disk gate with a ring shaped opening.

Figure 4:
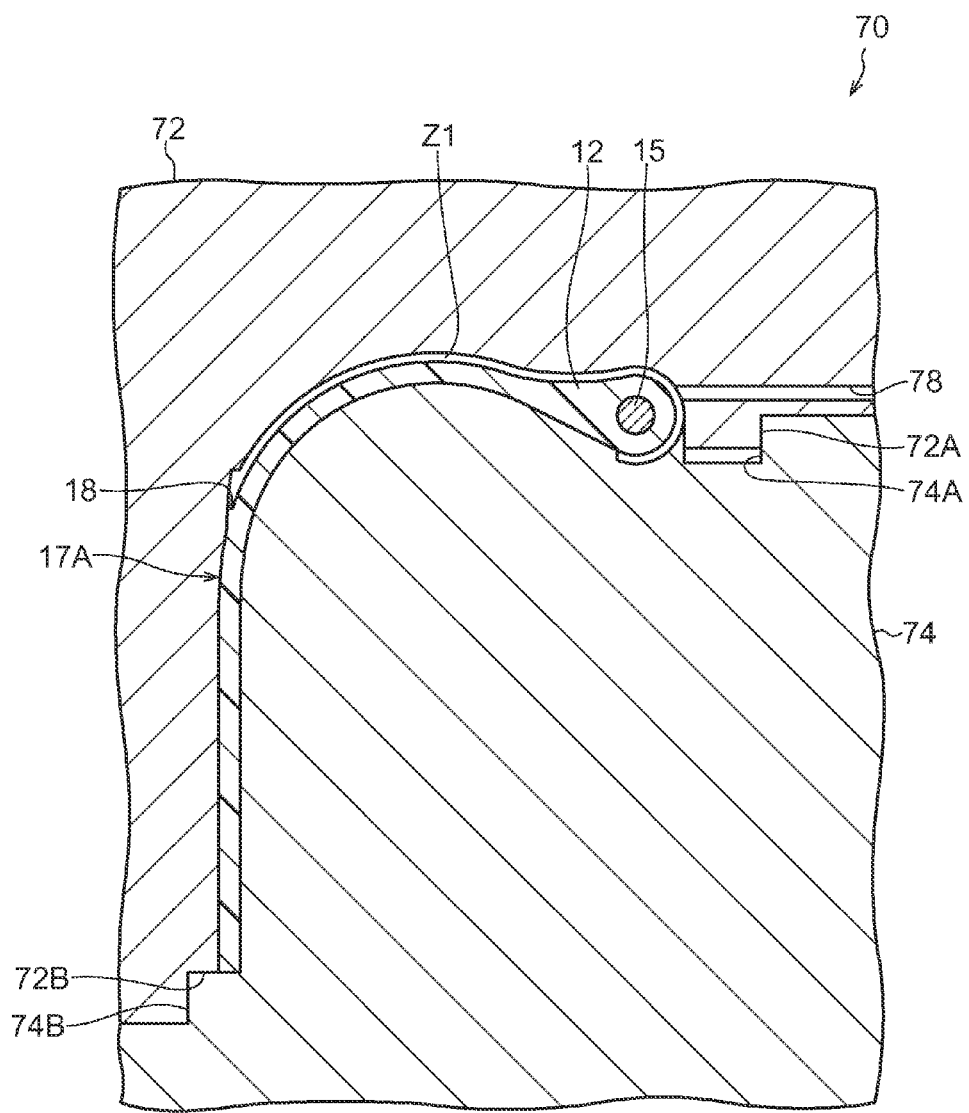
FIG. 4 is a partial cross-section of a mold employed in the first exemplary embodiment, illustrated in a closed state.

A structure is made such that a space Z1 set with a shape in communication with the gate 78, for forming the covering layer 24, is formed between the outer mold 72 and the tire frame half 17A when the tire frame half 17A has been housed inside the covering layer forming mold 70 and complete closed, as illustrated in FIG. 4.

A protrusion 72A and a recess 74A are configured at the mutual parting faces between the outer mold 72 and the inner mold 74 at the side where the bead portion 12 is disposed. A recess 72B and a protrusion 74B are configured at the parting faces on the center line CL side. The protrusion 72A of the outer mold 72 fits into the recess 74A of the inner mold 74, the protrusion 74B of the inner mold 74 fits into the recess 72B of the outer mold 72, the mutual parting faces make contact with each other, and the covering layer forming mold 70 is closed.

A gas escape hole (not illustrated in the drawings) is formed in the covering layer forming mold 70 to let out the air inside the cavity when the covering layer material is being injected into the cavity.

In order to form the covering layer 24, the tire frame half 17A is set in the inner mold 74, as illustrated in FIG. 4, the protrusion 72A of the outer mold 72 is fitted into the recess 74A of the inner mold 74, the protrusion 74B of the inner mold 74 is fitted into the recess 72B of the outer mold 72, and the parting faces are closed.

The covering layer material is injected into the cavity through the gate 78 in this state. When this is performed, the covering layer material that has been injected through the gate 78 is dammed by the tire frame step portion 18, and suppressed from flowing out from the space Z1. This thereby enables the covering layer 24 to be formed accurately in a specific position. The internal pressure in the space Z1 during injection molding can be maintained, and the covering layer 24 can be appropriately bonded to the tire frame member 17.

The tire frame half 17A is then removed from inside the covering layer forming mold 70. The tire frame half 17A is thereby formed with the covering layer 24.

In order to raise the bonding strength between the surface of the bead portion 12 of the tire frame half 17A and the covering layer 24, the surface of the bead portion 12 may be formed with an indentation/protrusion-shaped profile so as to obtain an anchor effect (a strong biting-in effect like that of dropping an anchor). The depth of the indentations and protrusions is preferably 2 mm or less, and more preferably 1 mm or less, in order to obtain such an anchor effect. It is conceivable that the strength of the molded product would be reduced if the depth of the indentations and protrusions was to be deeper than 2 mm. If the depth of the indentations and protrusions was less than 0.05 mm then it would be difficult to achieve a sufficient anchor effect. The molding surface of the mold 70 may be pre-formed with a corresponding indentation/protrusion-shaped profile in order to form such an indentation/protrusion-shaped profile. Surface roughening treatment of the surface may also be performed by buffing up in order to form the indentations and protrusions.

A bonding agent may also be coated on the surface at locations of the tire frame half 17A where the covering layer 24 is to be formed in order to raise the bonding strength between the surface of the tire frame half 17A and the covering layer 24. In such cases, the surface at locations to be coated with bonding agent is buffed in advance using sandpaper or the like in order to raise the bonding strength. Preferably the bonding agent is dried to some extent after being coated in order to raise the bonding force. Thus coating of the bonding agent is preferably performed in an atmosphere with a humidity of 70% or less. The bonding agent is, for example, triazine thiol-based, however, it is not particularly limited, and may be a chlorinated rubber-based bonding agent, a phenol resin-based bonding agent, an isocyanate-based bonding agent, or a halogenated rubber-based bonding agent.

The two tire frame halves 17A formed with the covering layer 24 are then aligned with each other and abutted at the tire equatorial plane CL (tire center), the welding thermoplastic material 19 is extruded toward the joining location (see FIG. 1A), and the two tire frame halves 17A joined together. This thereby produces the tire frame member 17 formed with the covering layer 24 from the bead portions 12 to the tread member 30.

In the present exemplary embodiment, the two tire frame halves 17A are joined together after forming the covering layer 24, however the tire frame halves 17A may be joined together first, and then the covering layer 24 formed.

The heated reinforcement cord 26 being discharged from a cord feeder (not illustrated in the drawings) is then wound in a spiral shape onto the outer peripheral face of the tire frame member 17 while the tire frame member 17 is rotated in a rotation device, so as to form the reinforcement layer 28.

The tread member main body 32 that is a pre-cured tread (PCT) is then bonded to the outside of the reinforcement layer 28. Bonding of the tread member main body 32 may be performed by vulcanization-bonding with the intermediate rubber 34 interposed therebetween.

Figure 6:
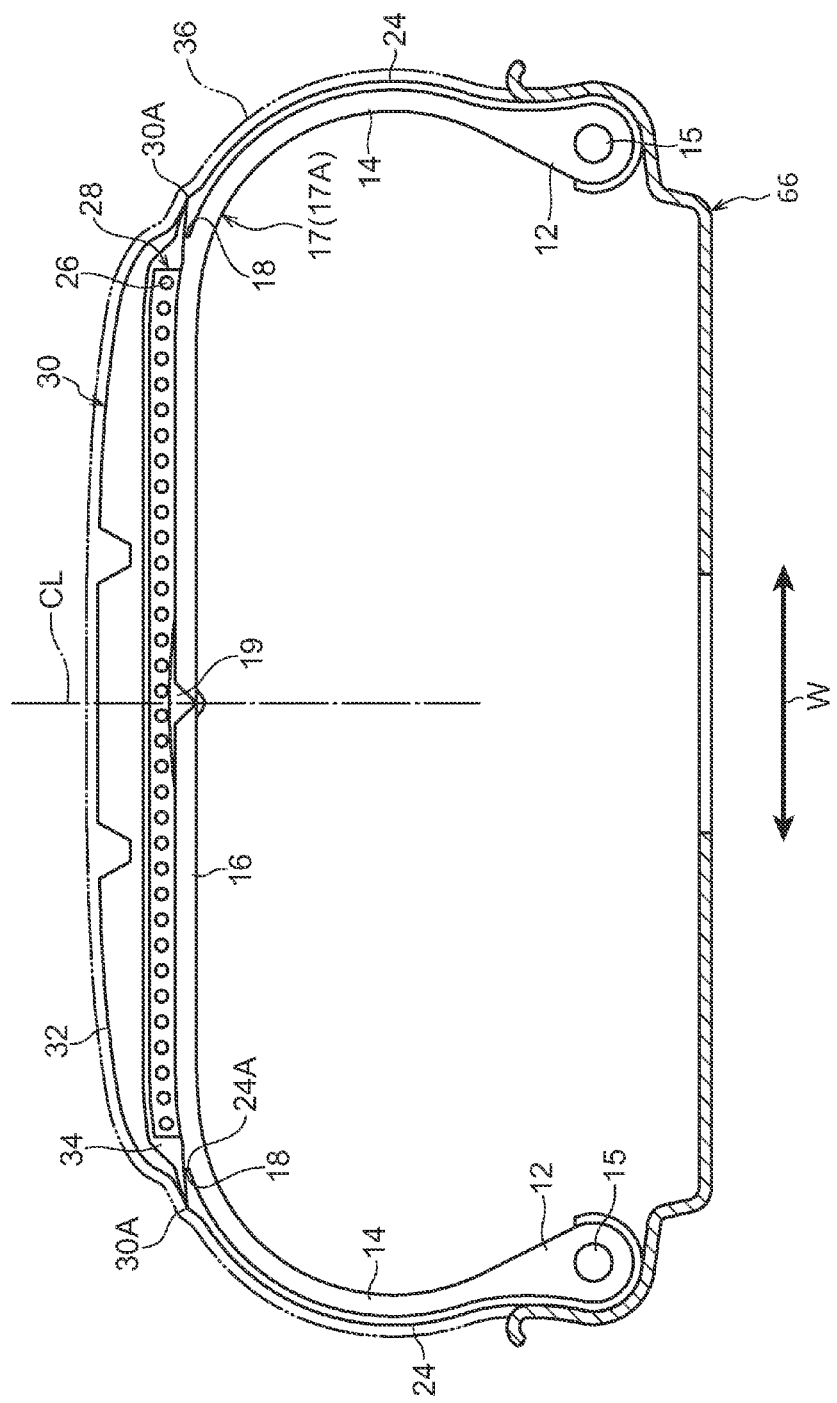
FIG. 6 is a cross-section illustrating a state during bonding of a tread member of a pneumatic tire according to the first exemplary embodiment.
Figure 7:
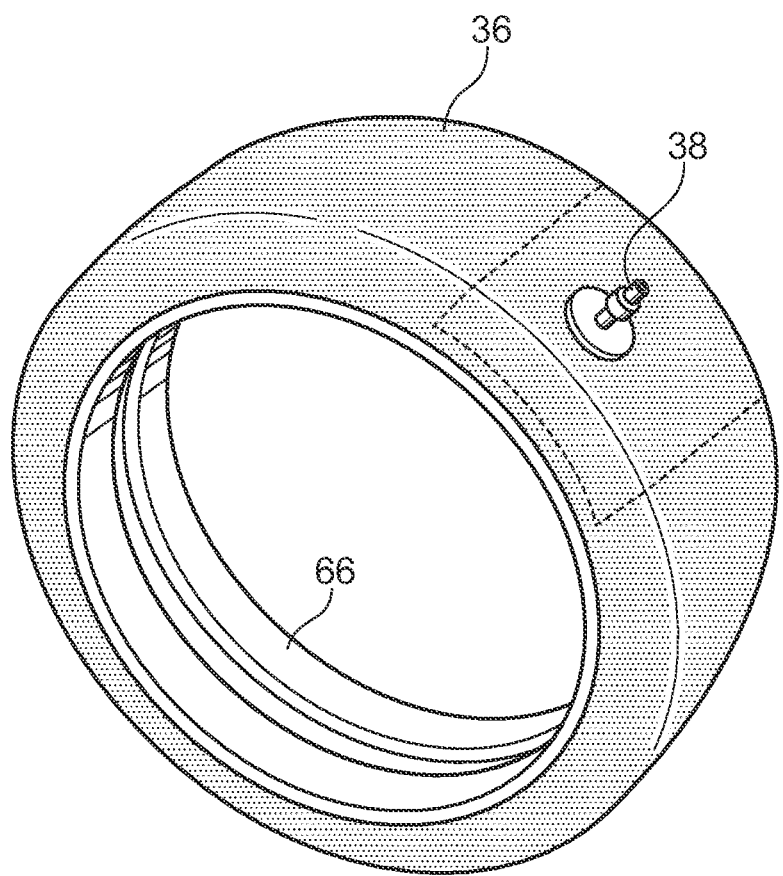
FIG. 7 is a perspective view illustrating an envelope and support members.

During vulcanization-bonding, as illustrated in FIG. 5, the un-vulcanized intermediate rubber 34 is laminated onto the reinforcement layer 28 of the tire frame member 17, and one turn of the tread member main body 32 is wrapped around the outside thereof. When this is performed, the tread member main body 32 and the end portions of the un-vulcanized intermediate rubber 34 in the tire axial direction are superimposed on the end portions of the covering layer 24, so as to be disposed covering the end faces 24A. Then, as illustrated in FIG. 6, the bead portions 12 are assembled to a pair of ring-shaped support members 66 having structures similar to those of the rim. Then the entire tire frame member 17 disposed with the tread member main body 32 is covered by an envelope 36, serving as an example of a bag covering member as illustrated in FIG. 7. The envelope 36 is then placed in close contact with the tread member main body 32 and the tire frame member 17, as illustrated in FIG. 6, by extracting air from an extraction opening 38. This thereby enables the tread member main body 32 and the intermediate rubber 34 to be pressed toward the tire frame member 17 side, and vulcanization processing is then performed in this state by placing in a vulcanizing device, not illustrated in the drawings.

The tread member 30 is thereby formed in this manner so as to manufacture the tire 10. A completely vulcanized, or a partially vulcanized, tread member main body 32 may be employed as the tread member main body 32 prior to vulcanization-bonding.

As explained above, in the present exemplary embodiment, the covering layer 24 is formed to span from the bead portions 12 of the tire frame member 17 to the end portions 30A of the tread member 30, avoiding exposure of the tire frame member 17. This thereby enables the tire frame member 17 to be protected while maintaining the physical properties demanded of the tire frame member 17 itself, such as rigidity, and enabling the weather resistance of the tire 10 to be improved.

The tire frame step portions 18 are formed in the tire frame member 17 to restrict the end faces 24A at the tire equatorial plane CL side of the covering layer 24. This thereby enables the covering layer material to be suppressed from flowing out past a specific position during manufacture in a mold, enabling the covering layer 24 to be formed accurately up to the specific position. This thereby enables the internal pressure to be maintained in the space Z1 during injection molding, enabling the covering layer 24 to be appropriately bonded to the tire frame member 17. When the outer mold 72 is closed so as to press against the tire frame member 17, the outer mold 72 is pressed with a strong force against the protruding portion (upper side of the step portion) of the tire frame member 17, and the pressing force against other locations thereon is relatively small. This thereby enables deformation of the tire frame member 17 due to injection of the covering layer material to be suppressed.

Second Exemplary Embodiment

Explanation next follows regarding a second exemplary embodiment. In the present exemplary embodiment, the same reference numerals are appended to portions similar to those of the first exemplary embodiment, and detailed explanation will be omitted thereof. A tire 90 of the present exemplary embodiment differs from that of the first exemplary embodiment in the covering layer and the shape of the end portions of the tread member, with other parts of the configuration being similar to those of the first exemplary embodiment.

Figure 8A:
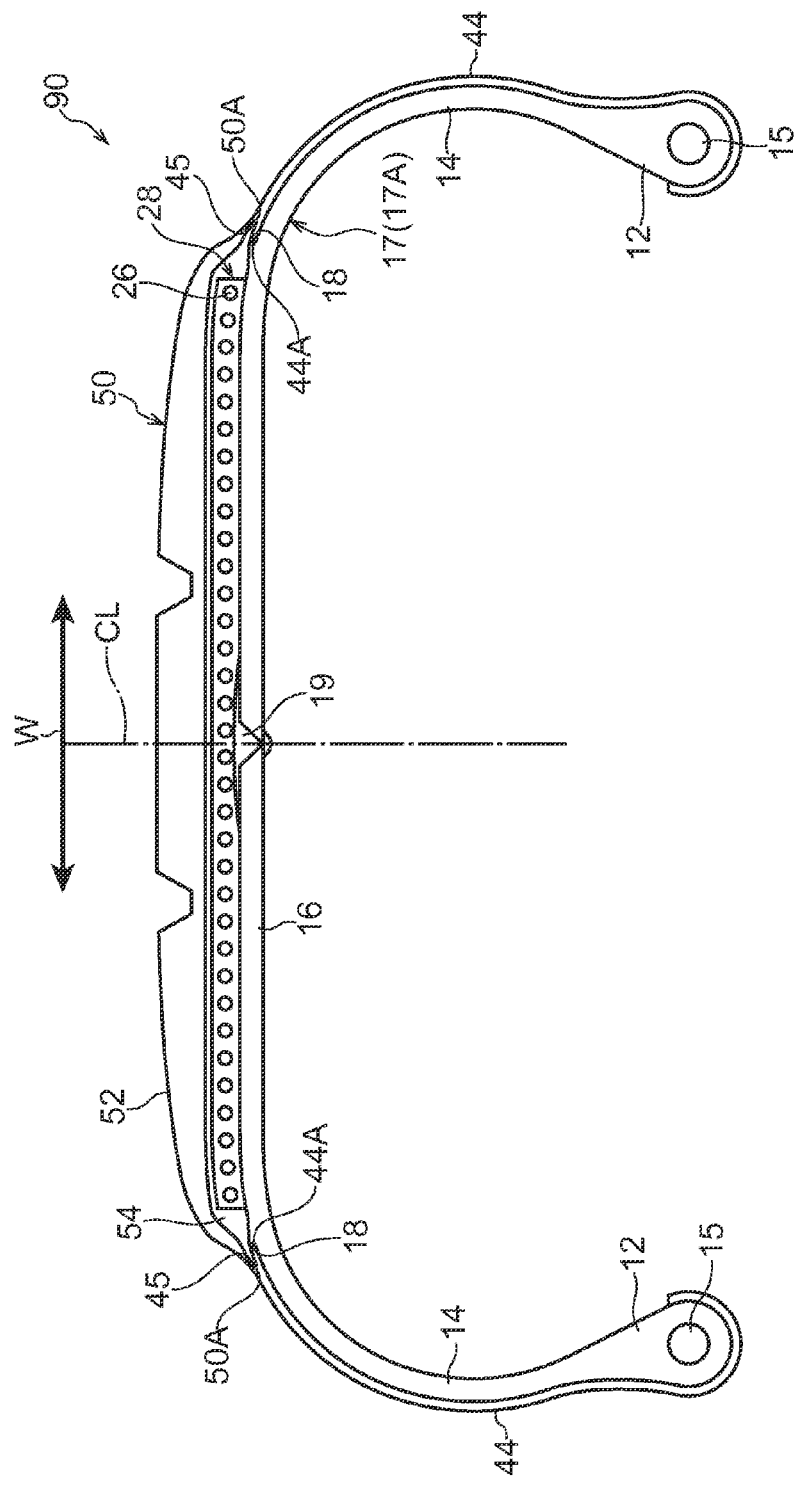
FIG. 8A is a cross-section of a pneumatic tire according to a second exemplary embodiment.
Figure 8B:
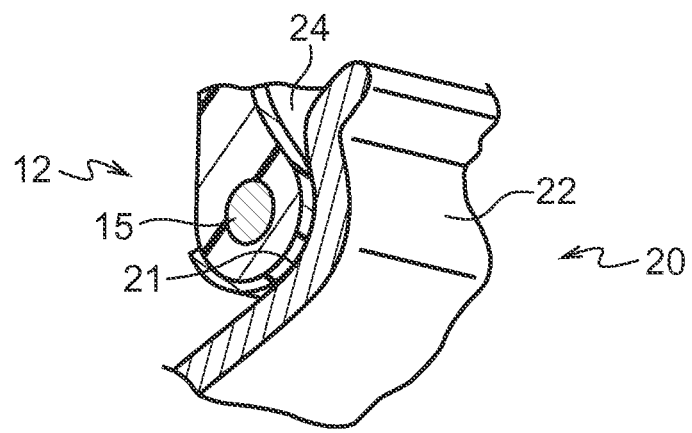
FIG. 8B is a partially enlarged cross-section of a perspective view of a pneumatic tire according to the second exemplary embodiment when mounted to a rim.
Figure 9:
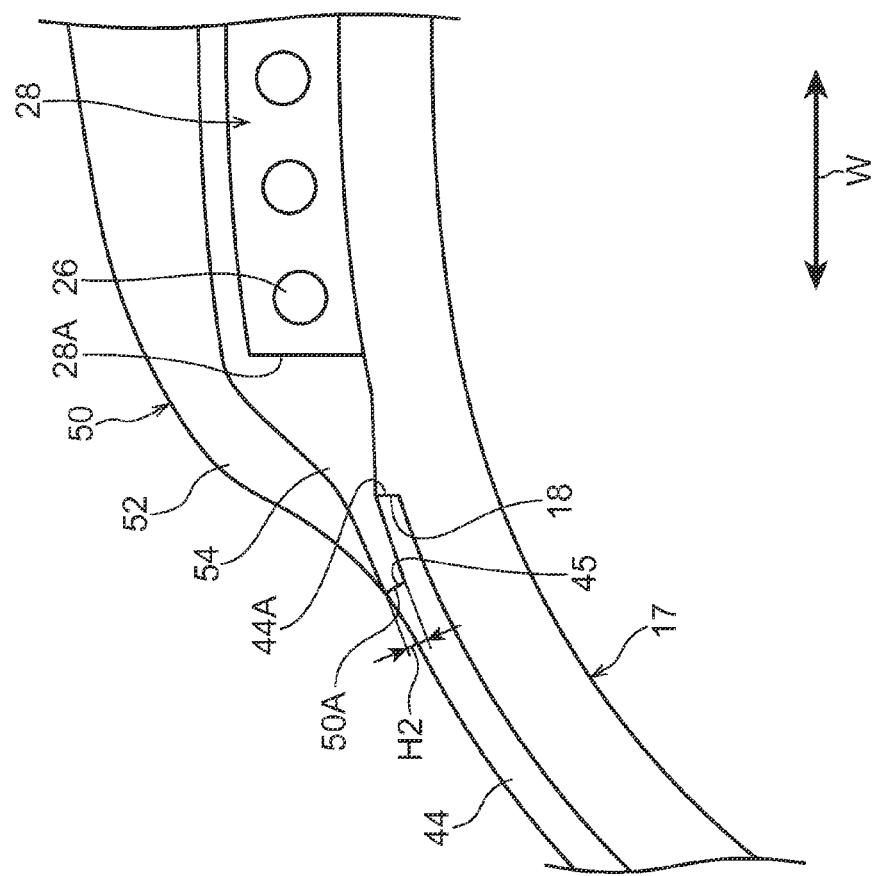
FIG. 9 is a partially enlarged cross-section of the tire shoulder portion of FIG. 8A.

As illustrated in FIG. 8A, FIG. 8B and FIG. 9, a covering layer 44 is formed to the tire frame member 17 so as to span from the bead portions 12 to the tire frame step portions 18. The end portions of the covering layer 44 on the bead portion 12 side are disposed further to the tire inner side (the air-filled side) than the close contact portions of the bead portions 12 with the rim 20. End faces 44A of the covering layer 24 formed at a tread member 50 side are in close contact with the tire frame step portion 18. Flow stopping walls 45 are formed further toward the tire axial direction outer side than the end faces 44A of the covering layer 44. The flow stopping walls 45 are step portions formed to the covering layer 44 so as to be lower on the tire equatorial plane CL side, and are integrally formed at the outer face of the covering layer 44. The flow stopping walls 45 are portions restricting the boundary with end faces 50A that form the end portions of the tread member 50. The thickness of the covering layer 44 is formed thicker at the tire axial direction outer side than at the tire axial direction inner side on either side of the portion where the flow stopping walls 45 are formed.

In the present exemplary embodiment, the flow stopping walls 45 are configured as a step, however, the flow stopping walls 45 may be formed as projections extending around the entire circumference in the tire circumferential direction.

A height H2 of the flow stopping walls 45 is preferably from 0.2 mm to 4.0 mm. This is because there is only a small damming effect to un-vulcanized intermediate rubber 54 during forming the tread member 30, as described below, if the height H2 of the flow stopping walls 45 is less than 0.2 mm, and because removal from the mold after forming the covering layer 44 becomes difficult when the height H2 exceeds 4.0 mm.

When the tire 90 is mounted to the rim 20, the covering layer 44 is in close contact with the rim 20, sealing the air-filled space inside the tire 90. Similar covering layer material may be employed for configuring the covering layer 44 as those in the covering layer 24 in the first exemplary embodiment. The modulus of elasticity of the covering layer 44 is preferably within a range similar to that of the covering layer 24 of the first exemplary embodiment.

The tread member 50 is disposed at the tire radial direction outer side of the tire frame member 17. The tread member 50 is disposed along the tire frame member 17, and configures the tire tread that is the ground contact portion of the tire 90. The tread member 50 includes a tread member main body 52 and the intermediate rubber 54. The tread member main body 52 is laminated onto the tire frame member 17, with the intermediate rubber 54 interposed therebetween. The end faces 50A of the tread member 50 in the tire axial direction are disposed adjacent to the flow stopping walls 45 of the covering layer 44 in the tire axial direction, and further to the tire axial direction outer side than the end faces 44A of the covering layer 44. The end faces 44A of the covering layer 44 are thereby covered by the tread member 50, and the entire outer face of the tire frame member 17 from the bead portions 12 to the tread member 50 is covered by the covering layers 44.

The tread member 50 may be configured from rubber or thermoplastic resin similarly to the tread member 30 of the first exemplary embodiment.

Figure 10:
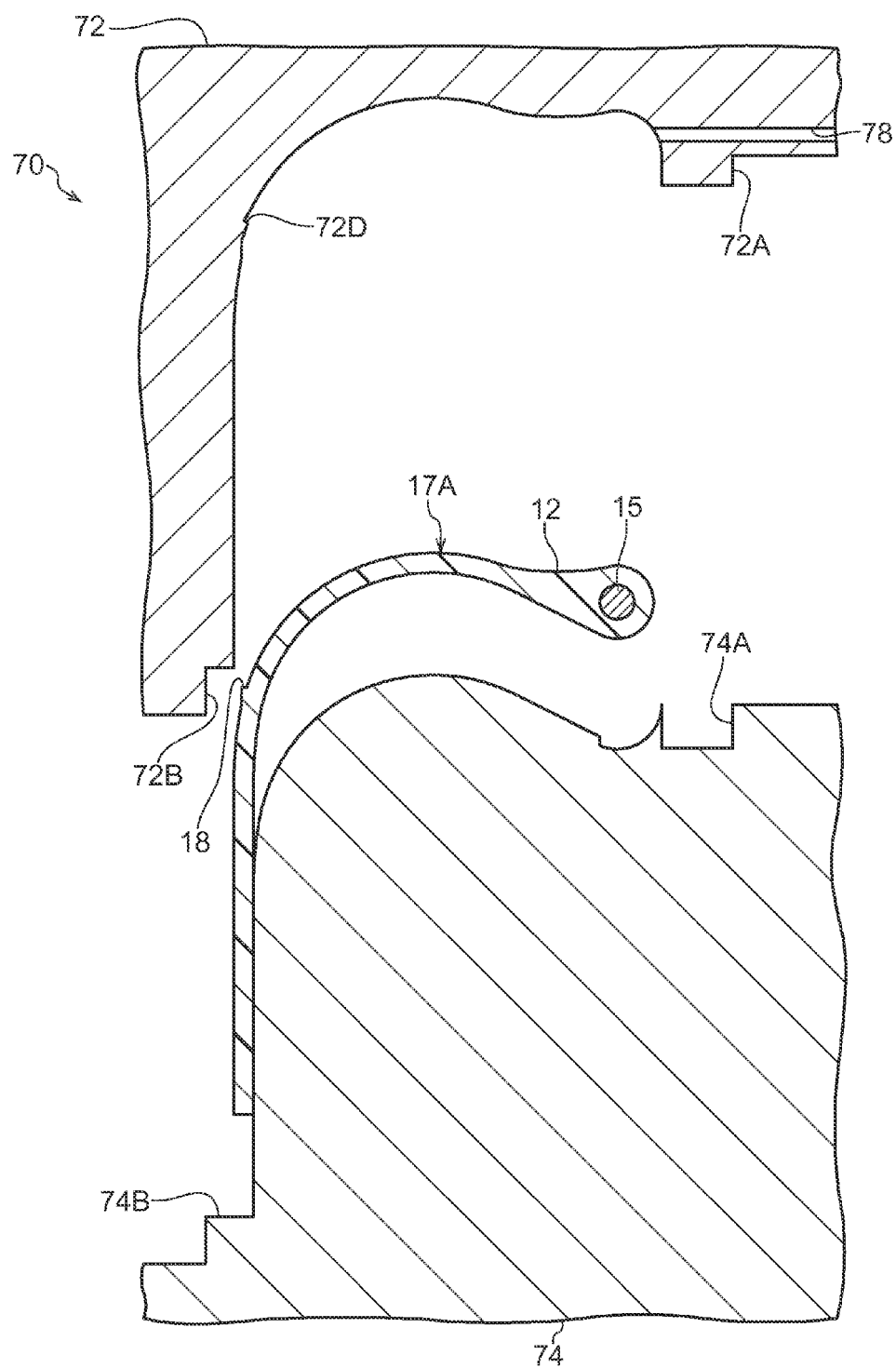
FIG. 10 is a partial cross-section of a mold employed in the second exemplary embodiment, illustrated in an open state.
Figure 11:
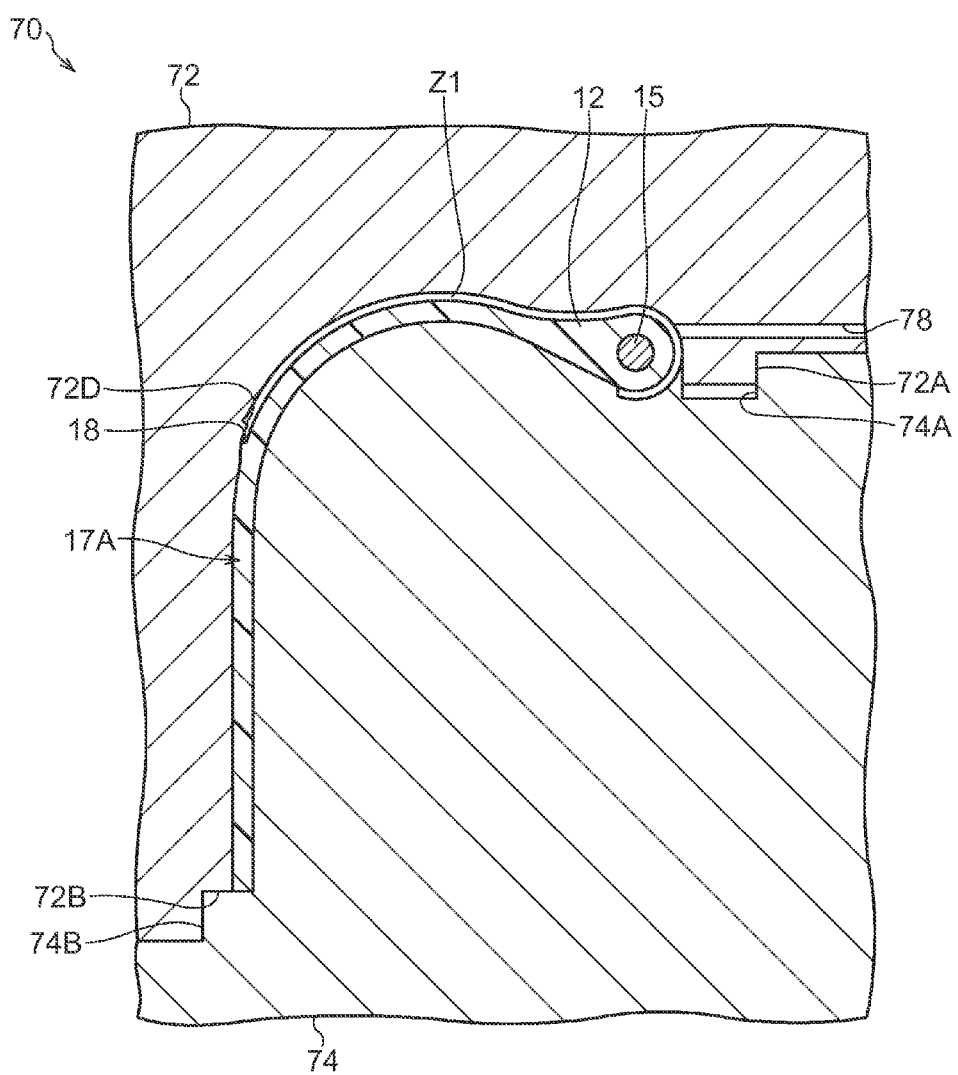
FIG. 11 a partial cross-section of a mold employed in the second exemplary embodiment, illustrated in a closed state.

Explanation next follows regarding a manufacturing method of the tire 90 according to the present exemplary embodiment. In the present exemplary embodiment, the tire frame halves 17A are formed by injection molding, similarly to in the first exemplary embodiment, and then covering layer material is injection molded onto the tire frame halves 17A to produce the covering layer 44. The mold employed when this is performed may, as illustrated in FIG. 10, be formed as the mold of the tire frame step portion 18 with a step 72D needed for forming the flow stopping walls 45 formed to the outer mold 72 of the first exemplary embodiment, with molding performed in a similar sequence to that of the first exemplary embodiment. This thereby enables the tire frame halves 17A formed with the flow stopping walls 45 to be produced.

Figure 12:
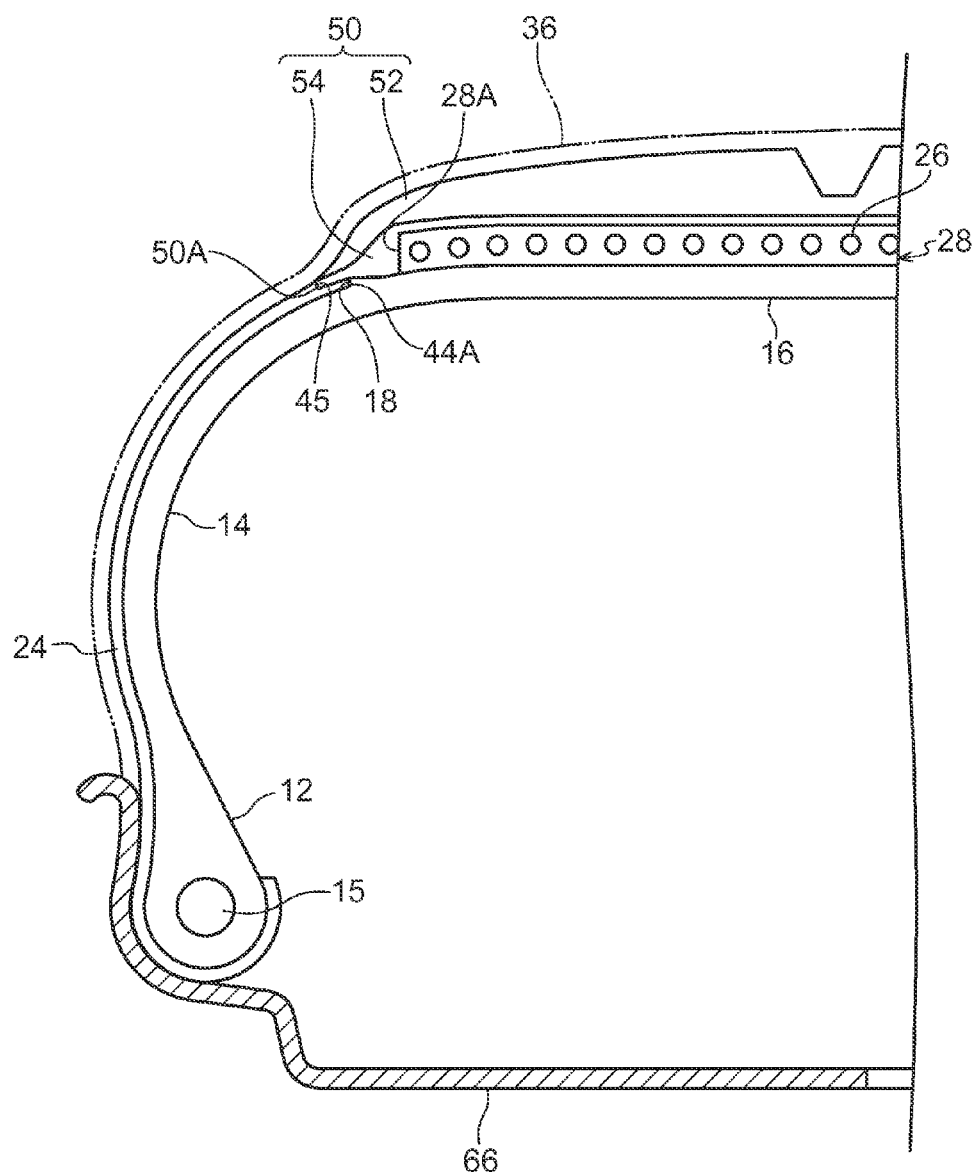
FIG. 12 is half a cross-section illustrating a state when a tread member of a pneumatic tire according to the second exemplary embodiment is being bonded.

Then, similarly to in the first exemplary embodiment, the tread member main body 52 that is a pre-cured tread (PCT) is bonded to the outside of the reinforcement layer 28. Bonding of the tread member main body 52 is performed by interposing the intermediate rubber 54. During vulcanization-bonding, the un-vulcanized intermediate rubber 54 is layered on the reinforcement layer 28 of the tire frame member 17, and the tread member main body 52 disposed at the outer side thereof. When this is performed, as illustrated in FIG. 12, the un-vulcanized intermediate rubber 54 is disposed further to the tire axial direction inner side than the flow stopping walls 45, such that the end faces 50A of the tread member 50 formed by the intermediate rubber 54 after vulcanization processing are disposed bonded to the flow stopping walls 45. The tread member main body 52 and the end portions in the axial direction of the intermediate rubber 54 are disposed so as to be further to the tire axial direction inner side than the flow stopping walls 45. Similarly to in the first exemplary embodiment, when assembled to support members 66 in this state, the envelope 36 is employed so as to cover the entire tire frame member 17 disposed with the tread member main body 32, and vulcanization processing is performed.

The tread member 50 is thereby formed so as to manufacture the tire 90.

According to the present exemplary embodiment, the flow stopping walls 45 are formed to the covering layer 44, and so the flow stopping walls 45 act to dam the un-vulcanized intermediate rubber 54 when the tread member 50 is being formed. This thereby enables the intermediate rubber 54 to be suppressed from protruding and flowing out past a specific position at the tire axial direction outer side end portions of the tread member 50, enabling the tire axial direction end portions of the tread member to be appropriately formed. The internal pressure in the space Z1 is also maintained during injection molding, enabling the covering layer 44 to be appropriately bonded to the tire frame member 17.

Explanation has been given above of embodiments of the present invention using exemplary embodiments, however, the exemplary embodiments are merely examples, and it is possible to implement various modifications and to make appropriate changes to the sequence of the manufacturing procedure within a range not departing from the spirit. Obviously, the scope of rights encompassed by the present invention is not limited by these exemplary embodiments.

The invention claimed is:

1. A tire, comprising:
a tire frame member that is formed from a resin material and that includes at least a bead portion;
a tread member that is disposed at a tire radial direction outer side of the tire frame member and that configures a tire tread;
a tire frame step portion that is formed at a tire radial direction outer face side of the tire frame member, and that is formed further toward a tire equatorial plane side than a tire axial direction end portion of the tread member, and that becomes lower at a tire axial direction outer side;
a covering layer that is formed at an outer side of the tire frame member so as to span from the bead portion to the tire frame step portion; and
a flow stopping wall formed at an end portion on a tire tread side of the covering layer and adjacent to the tire axial direction end portion of the tread member, the flow stopping wall comprising a step portion that is lower at the tire equatorial plane side.

2. The tire of claim 1, wherein:
the tire frame member includes a reinforcement layer that is disposed at a tire radial direction outer side portion and that has a reinforcement cord; and
the tire frame step portion is disposed further toward the tire axial direction outer side than a tire shoulder side end portion of the reinforcement layer.

3. The tire of claim 1, wherein a height of the flow stopping wall is from 0.2 mm to 4.0 mm.

4. The tire of claim 1, wherein the flow stopping wall comprises a plurality of flow stopping walls that are configured to dam a flow of material during formation of the tread member.

5. The tire of claim 1, wherein the flow stopping wall is integrally formed at an outer face of the covering layer.

6. The tire of claim 1, wherein the flow stopping wall is formed further toward the tire axial direction outer side than an end face of the covering layer and defines a boundary with an end face of the tread member.

* * * * *